R. GRIESE.
ENSILAGE MACHINE.
APPLICATION FILED APR. 5, 1916.
1,279,103.
Patented Sept. 17, 1918.
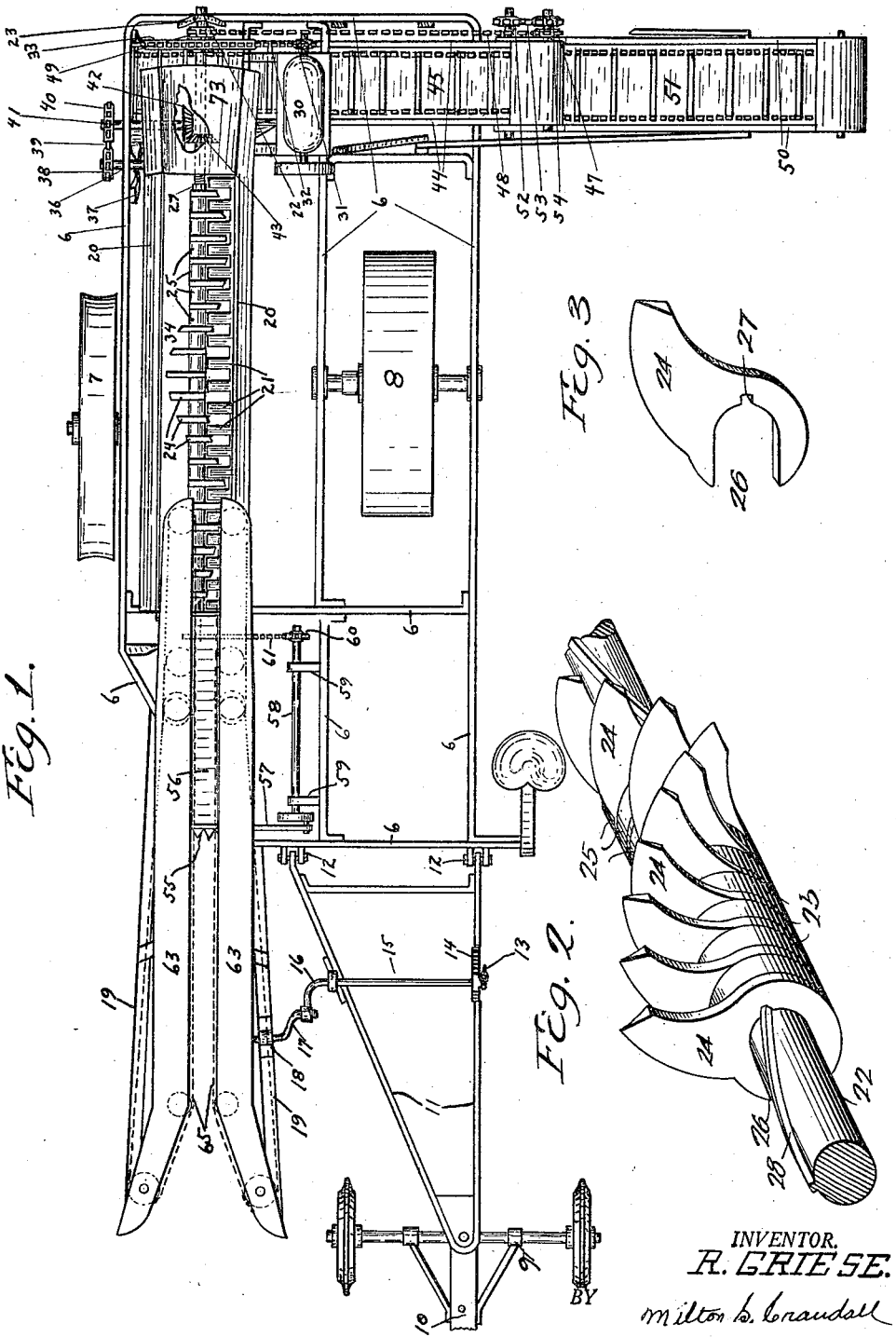

UNITED STATES PATENT OFFICE.

RUDOLPH GRIESE, OF GALVA, IOWA.

ENSILAGE-MACHINE.

1,279,103.  Specification of Letters Patent.  Patented Sept. 17, 1918.

Application filed April 5, 1916. Serial No. 89,056.

*To all whom it may concern:*

Be it known that I, RUDOLPH GRIESE, a citizen of the United States, and a resident of Galva, in the county of Ida and State of Iowa, have invented certain new and useful Improvements in Ensilage - Machines, of which the following is a specification.

The present invention relates to agricultural implements more particularly to machines of this general class designed to harvest corn and cut it into ensilage.

The invention has for its primary object the production of a machine of this class, embodying certain novel features of construction and arrangement of parts whereby the stalks are severed and dropped into an ensilage mechanism.

Another object of the invention is the production of a machine of this class embodying certain novel features of construction, combination and relative arrangement of parts, whereby the number of elements are reduced to the minimum, thereby reducing the cost of manufacture, operation and maintenance.

Another object of the invention is the production in a machine of this class of improved ensilage mechanism.

With these and other objects in view, the invention will be fully understood from the following description, reference being had to the accompanying drawings, which form a part of this application and in which like characters of reference indicate corresponding parts throughout the several views, of which,—

Figure 1 is a plan of a machine constructed in accordance with the invention; Fig. 2 is a fragmentary perspective view of the ensilage cutting means; and Fig. 3 is a similar view of one of the blades of the same.

Referring, now, to the illustrations, the main-frame, 6, of any preferred construction, is mounted on travel wheels, 7 and 8, the latter of which, in the present embodiment, serves as a power-wheel. The front of the structure is supported by a truck, 9, provided with suitable draft-rigging, 10, by which animals may draw the machine.

The front of the machine is preferably adjustable vertically, to regulate the height at which the corn is severed, and for this purpose a second frame, 11, is employed, the forward end of which is mounted upon the truck and the rear end of which is pivoted, as at 12, to the front and adjacent one side of the main-frame. A suitable adjusting means is provided including a lever, 13, fulcrumed upon and engageable with a quadrant, 14, mounted on the second frame. The lever controls a rock-shaft, 15, provided with a crank-arm, 16, pivoted to a toggle link, 17, pivoted as at 18, on the innermost of two forwardly inclined arms, 19, suitably secured to the main-frame.

The ensilage mechanism comprises a concave mounted at one side of the main-frame and including walls, 20, disposed longitudinally of the main-frame; and teeth, 21, on the inner side of one of said walls. Intermediate and in parallelism with the walls is mounted a rotating cutting mechanism including a suitable shaft, 22, journaled in suitable bearings, 23, mounted on the main-frame; and provided with radial blades, 24, adapted to pass between and coact with the teeth to cut the stalks into ensilage when the shaft is rotated.

The blades are preferably arranged in two spiral series approaching the ends of the shaft, from the center thereof, in opposite helices, as shown in Fig. 1 and amplified in Fig. 2.

The cutting members are separated by suitable spacing collars, 25, interposed between the respective blades.

The mechanism is so constructed as to permit of the blades being readily interchanged or individually removed and replaced, as for sharpening or repairing. For this reason the blades are each formed with a lateral notch, 26, and a key-way, 27, engageable with a spiral key, or feather, 28, which approaches the intermediate portion of the shaft from the ends thereof in oppositely disposed helices. By thus arranging the blades in opposite turns around the shaft, the stalks are cut from their ends toward the center, whereby there can be no tendency to displace the stalks as when the blades are arranged spirally in one direction. The blades are firmly secured by nuts, 29, threaded on the end portions of the shaft.

The cutting mechanism may be actuated from any preferred source of power, but in the embodiment chosen for illustration a gas-engine, 30, is employed, which is mounted upon the rear portion of the main-frame and provided on its main-shaft with a sprocket-wheel, 31, connected by a drive-chain, 32, with a large sprocket-wheel, 33, mounted on the shaft, 22.

Below the ensilage-cutting mechanism may be mounted an endless-conveyer, 34, driven by a shaft, 36, journaled in bearings, 37, upon the main-frame, and provided with a sprocket-wheel, 38 connected by a chain, 39, with a similar wheel, 40, mounted on a shaft, 41, mounted on the main-frame and carrying a bevel-gear, 42, intermeshed with a similar gear, 43, mounted on the shaft, 22.

The rear of the main-frame supports a suitable lateral conveyer including a frame, 44, and an endless conveyer, 45, driven by a sprocket-wheel, 47, connected by a chain, 48, with a similar wheel, 49, mounted on the shaft, 22.

The endless-conveyer receives the ensilage from the conveyer, 34, and conveys it laterally into a suitable elevator including a frame, 50, and an endless-conveyer, 51, carried thereby and actuated by a sprocket-wheel, 52, connected by a drive chain, 53, with a similar wheel, 54, mounted coaxially with the sprocket-wheel, 47.

The elevator, it will be observed, is adapted to deliver the ensilage into a suitable carrier (not shown) traveling at the side of the machine; or, if ensilage is being cut while the machine stands still, it may be delivered by the elevator into a suitable receptacle, or piled on the ground.

In front of the ensilage mechanism is mounted a suitable stalk-severing mechanism, which, in the present embodiment includes a reciprocating sickle, 55, carried at the forward end of a trough-like, stalk-support, 56, mounted on the main-frame, and inclined forwardly and downwardly from a point above the ensilage mechanism.

The sickle is operated in unison with the ensilage mechanism, it being actuated by a pitman, 57, driven by a shaft, 58, journaled in bearings, 59, on the main-frame; and carrying a sprocket-wheel, 60, driven by a drive-chain, 61, actuated by the shaft 22.

The stalk support and severing means are alined vertically with the shaft, 22; and the stalks are directed toward the severing means by suitable row-guides, 63, disposed in spaced relation to each other, inclined downwardly from a point above the ensilage mechanism and carried by the main frame.

The guides are provided with endless conveyers, 65, of any suitable construction and arrangement to prevent the stalks from being bent over by friction with the guides or by engagement with the severing mechanism; and actuated by any preferred means to deliver the severed stalks into the ensilage mechanism.

At the rear end of the ensilage mechanism is a guard-apron, 73, which is secured to the side boards, 20, is inclined slightly forwardly and serves to support the tips of long stalks and feed them into the ensilage mechanism.

By virtue of the construction now set forth it is evident that as the machine proceeds, the stalks will be severed and carried upwardly and rearwardly upon the support, 56, by means of the chains, 65; and are thereby delivered into the ensilage mechanism. After the stalks are cut into ensilage, the latter is delivered from the machine through the medium of the conveyers and elevator, as hereinbefore described.

Having thus described my invention, what I claim as new and desire to secure by Letters Patent, is,—

An ensilage mechanism including a rotatable horizontal shaft having a spiral key thereon approaching the intermediate portion of the shaft from the ends thereof in oppositely-disposed helices, radial blades mounted on the shaft and each having a key way engageable with said key and a lateral notch to permit individual mounting and dismounting of the blade, collars interposed between the blades, and nuts threaded on the ends of the shaft to clamp the blades and collars together.

In testimony whereof I have hereunto set my hand.

RUDOLPH GRIESE.

Copies of this patent may be obtained for five cents each, by addressing the "Commissioner of Patents, Washington, D. C."